No. 726,209. PATENTED APR. 21, 1903.
G. W. WILSON.
VEHICLE AXLE.
APPLICATION FILED JAN. 8, 1903.
NO MODEL.

Witnesses
Chas. K. Davies
N. E. Moore

George W. Wilson,
Inventor
by Wm. J. Moore
Attorney

UNITED STATES PATENT OFFICE.

GEORGE W. WILSON, OF ARCADIA, LOUISIANA.

VEHICLE-AXLE.

SPECIFICATION forming part of Letters Patent No. 726,209, dated April 21, 1903.

Application filed January 8, 1903. Serial No. 138,225. (No model.)

*To all whom it may concern:*

Be it known that I, GEORGE W. WILSON, a citizen of the United States, residing at Arcadia, in the parish of Bienville and State of Louisiana, have invented certain new and useful Improvements in Vehicle-Axles, of which the following is a specification.

My invention relates to improvements in vehicle-axles, and refers particularly to an axle specially adapted for use upon buggies or light vehicles; and one object of my invention is the provision of an axle in which the skein may be applied or detached, as circumstances require, and which when in position will perform its functions in a thorough manner.

Another object of my invention is the provision of an axle permitting of the application or removal of the skein at will and which will have novel means for supplying the lubricant.

Another object of my invention is the provision of an axle which cannot possibly become accidentally detached and which will possess merit in point of durability, simplicity, and inexpensiveness.

With these objects in view my invention consists of a vehicle-axle embodying novel features of construction and combination of parts, substantially as disclosed herein.

Figure 1:
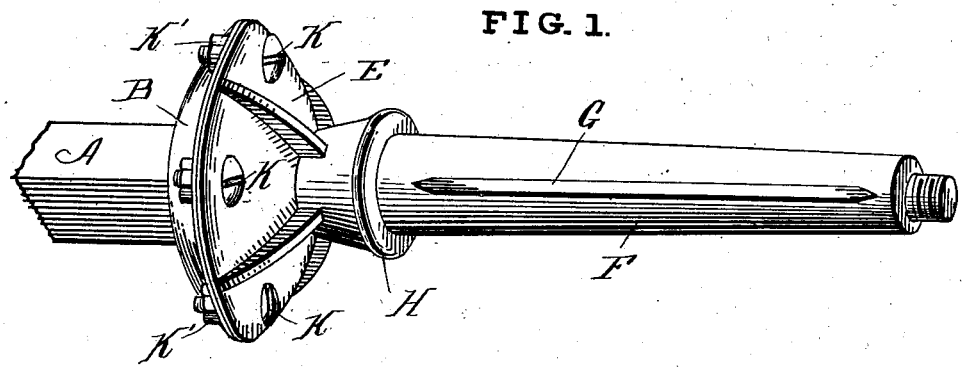
Figure 2:
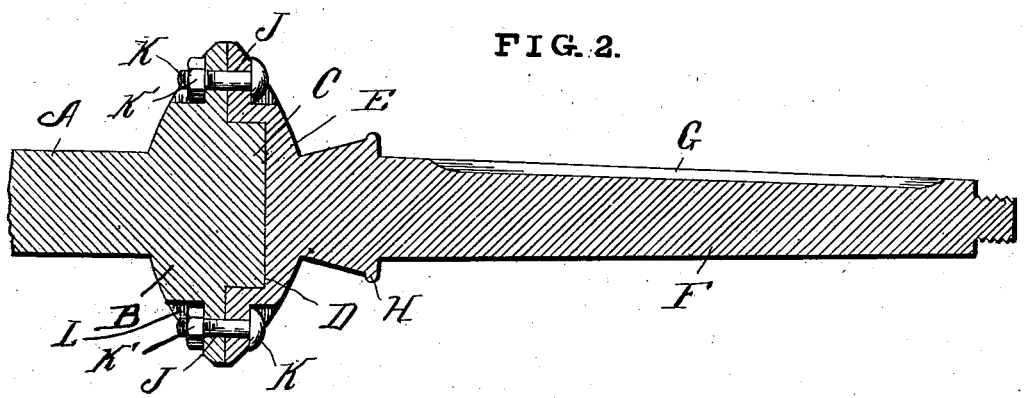
Figure 3:
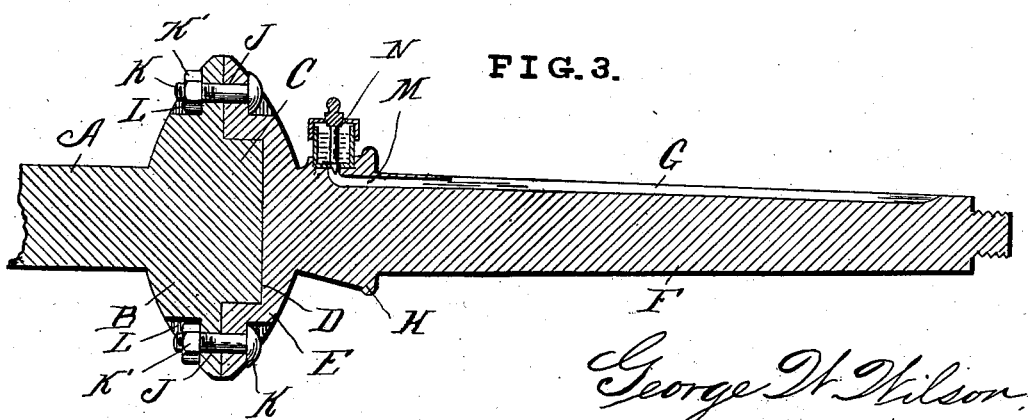

Figure 1 represents a perspective view of one end of the axle complete. Fig. 2 represents a central sectional view, and Fig. 3 represents a sectional view of a modified construction, showing my novel form of lubricating means.

In the drawings, A designates the axle proper, which is preferably made of metal and of rectangular shape, having on its outer end the circular head or disk B, provided with the central circular lug or boss C, which fits in the circular socket D, formed on the similar circular disk or head E on the inner end of the skein F, which skein is provided with the lubricating-channel G and with the collar H. The disks on the axle and skein fit snugly together and are provided with through-opening J to receive fastening-bolts K, which have their threaded ends engaged by nuts K', said nuts fitting in recesses or seats L, which serve to lock the nuts and prevent turning thereof.

In the modified form of my invention I provide the oil-channel M, which leads through the skein to the oil-passage of the skein, and this passage is closed by and controlled by the oil-holding and regulating feed device N, and it will be understood that this serves as an efficient and reliable means for supplying the lubricant to the hub.

It will thus be seen that I provide an axle which can be readily taken apart for purpose of storing or transportation or to suit the convenience, which will perform its functions in an efficient manner, and which is practical in every particular.

I claim—

The vehicle-axle herein shown and described, consisting of the axle proper having the lug, the contiguous disk formed with bolt-openings and angular nut-receiving recess, the skein having the hub-abutting shoulder the disk formed with bolt-openings alining with the bolt-openings of the disk, on the axle said skein also having the socket to receive the lug on the axle, the bolts passing through the disks, and the nuts engaging the bolts and locked by the recesses of the disk on the axle.

In testimony whereof I affix my signature in presence of two witnesses.

GEORGE W. WILSON.

Witnesses:
T. D. STEWART,
SAM DAVIS.